(12) United States Patent
Gu et al.

(10) Patent No.: US 11,167,685 B2
(45) Date of Patent: Nov. 9, 2021

(54) VEHICLE FOR CARRYING CONTAINERS

(71) Applicant: BEIJING TUSEN WEILAI TECHNOLOGY CO., LTD., Beijing (CN)

(72) Inventors: Xiaoping Gu, Beijing (CN); Chao Yan, Beijing (CN); Ming Wang, Beijing (CN); Jie Sun, Beijing (CN)

(73) Assignee: BEIJING TUSEN WEILAI TECHNOLOGY CO., LTD., Beijing (CN)

( * ) Notice: Subject to any disclaimer, the term of this patent is extended or adjusted under 35 U.S.C. 154(b) by 156 days.

(21) Appl. No.: 16/290,830

(22) Filed: Mar. 1, 2019

(65) Prior Publication Data
US 2019/0359113 A1   Nov. 28, 2019

(30) Foreign Application Priority Data

Mar. 2, 2018   (CN) .......................... 201810174846.5

(51) Int. Cl.
*B64D 9/00*       (2006.01)
*B60P 7/08*       (2006.01)
*B60P 7/13*       (2006.01)
*G01S 15/08*      (2006.01)

(52) U.S. Cl.
CPC .............. *B60P 7/132* (2013.01); *G01S 15/08* (2013.01)

(58) Field of Classification Search
None
See application file for complete search history.

(56) References Cited

U.S. PATENT DOCUMENTS

| 9,937,997 B2 * | 4/2018 | Himmelmann ........ B64D 9/003 |
| 2007/0292228 A1 * | 12/2007 | Watson .................... B60P 7/132 |
| | | 410/82 |
| 2011/0116886 A1 * | 5/2011 | Franzen .................... B60P 7/13 |
| | | 410/70 |
| 2017/0158110 A1 * | 6/2017 | Jo ........................... B60P 7/132 |

FOREIGN PATENT DOCUMENTS

| CN | 106337606 A | * | 1/2017 |
| JP | 2007223367 A | * | 9/2007 |
| TW | 201323747 A | * | 6/2013 |

* cited by examiner

*Primary Examiner* — Angela Y Ortiz
*Assistant Examiner* — Aarron E Santos
(74) *Attorney, Agent, or Firm* — Paul Liu; Julie J. Muyco; Perkins Coie, LLP

(57) ABSTRACT

The present disclosure relates to vehicle technology, and more particularly, to a vehicle for carrying a container. The vehicle includes: a vehicle body, at least one locking mechanism provided on the vehicle body and a microcontroller unit communicatively connected to each of the at least one locking mechanism and configured to control each of the at least one locking mechanism to switch between a locked state and an unlocked state. Each of the at least one locking mechanism is connected fixedly to the container when the locking mechanism is in the locked state, such that the container is fixed to the vehicle body. The vehicle is advantageous in that it is capable of locking and unlocking the container in a simple way, thereby improving the efficiency of the vehicle in transportation of the container.

18 Claims, 3 Drawing Sheets

VEHICLE FOR CARRYING CONTAINERS

CROSS-REFERENCE TO RELATED APPLICATION(S)

This U.S. Patent document claims the priority of and the benefits of Chinese Patent Application No. 201810174846.5 of the same title and content that was filed by Applicant Beijing Tusen Weilai Technology Co., Ltd. at the State Intellectual Property Office of China (SIPO) on Mar. 2, 2018, which is incorporated by reference herein in its entirety.

TECHNICAL FIELD

The present disclosure relates to vehicle technology, and more particularly, to a vehicle for carrying a container.

BACKGROUND

With the prosperous development of the global economy and trade, logistics has become more and more important, which has effectively promoted the vigorous development of the container transportation business. In places where many containers are stacked, such as ports or docks, vehicles for carrying containers become the main transportation equipment. Therefore, in order to improve the overall operation efficiency and utilization of such ports or docks, it is desired to improve the transportation efficiency of the vehicles. However, conventional locking structures for containers in vehicles are complicated and inconvenient to lock and unlock, resulting in a low efficiency in vehicle transportation.

SUMMARY

The present disclosure provides a vehicle for carrying a container, capable of locking and unlocking the container in a simple way, thereby improving the efficiency of the vehicle in transportation of the container.

In order to achieve the above object, the following solutions are provided according to the present disclosure.

A vehicle for carrying a container is provided. The vehicle includes a vehicle body on which a container is placed. The vehicle further includes at least one locking mechanism provided on the vehicle body and a microcontroller unit communicatively connected to each of the at least one locking mechanism and configured to control each of the at least one locking mechanism to switch between a locked state and an unlocked state. When the locking mechanism is in the locked state, each of the at least one locking mechanism is connected fixedly to the container, such that the container is fixed to the vehicle body. When each of the at least one locking mechanism is in the unlocked state, the container, when having an external force acting thereon, is movable with respect to the vehicle body.

Preferably, the vehicle may further include a pressure detection mechanism provided on the vehicle body and communicatively connected to the microcontroller unit. The pressure detection mechanism may be configured to detect a value of a pressure applied by the container on the vehicle body and input a signal indicating the detected value of the pressure to the microcontroller unit. When the value of the pressure as detected by the pressure detection mechanism is larger than a predetermined value, the microcontroller unit may control each of the at least one locking mechanism to act to switch from the unlocked state to the locked state.

Preferably, each of the at least one locking mechanism may include a housing mounted to the vehicle body, a lock protruding from a top of the housing, a lock lever connected fixedly to the lock and mounted to the housing in such a manner that the lock lever is rotatable about its axis, and a driving component for driving the lock lever to rotate. The driving component may be communicatively connected to the microcontroller unit and configured to act based on an output signal received from the microcontroller unit to drive the lock lever to rotate by a predetermined angle such that the lock may lock and unlock the container.

Preferably, each of the at least one locking mechanism may further include a first photoelectric switch and a second photoelectric switch each mounted to the housing, and a block sheet mounted to the lock lever. Each of the first photoelectric switch and the second photoelectric switch may be communicatively connected to the microcontroller unit and configured to input a switching signal to the microcontroller unit. When the microcontroller unit controls the locking mechanism to switch from the unlocked state to the locked state, the driving component may drive the lock lever to rotate by a predetermined angle in a first direction, such that the block sheet is at a position corresponding to the first photoelectric switch and the first photoelectric switch transmits a locking signal to the microcontroller unit. When the microcontroller unit controls the locking mechanism to switch from the locked state to the unlocked state, the driving component may drive the lock lever to rotate by a predetermined angle in a second direction opposite to the first direction, such that the block sheet is at a position corresponding to the second photoelectric switch and the second photoelectric switch transmits an unlocking signal to the microcontroller unit.

Preferably, each of the at least one locking mechanism may further include a transmission component connected transmissively between the driving component and the lock lever.

Preferably, the transmission component may include a worm-gear component, a gear transmission component or a threaded transmission component.

Preferably, the driving component may include a stepper motor.

Preferably, the vehicle may further include a plurality of guiding blocks mounted to the vehicle body and configured to locate the container such that the container is aligned with each of the at least one locking mechanism.

Preferably, the vehicle may further include a distance detection unit and an electronic control unit each communicatively connected to the microcontroller unit. The electronic control unit may be configured to automatically control the vehicle to enable automated driving of the vehicle. The distance detection unit may be configured to detect a distance between the container and the vehicle body in a vertical direction and transmit a value of the detected distance to the microcontroller unit, such that when the value of the distance detected by the distance detection unit is larger than a predetermined distance, the microcontroller unit transmits a movement signal to the electronic control unit and the electronic control unit controls the vehicle to move based on the movement signal received from the microcontroller unit.

Preferably, the predetermined angle may be 90°.

Preferably, the distance detection unit may include an ultrasonic sensor.

When compared with the related art, the present disclosure has the following advantageous effects. With the vehicle for carrying a container according to the present disclosure, at least one locking mechanism may fix the container to the vehicle body. Under control of a microcontroller unit, the locking mechanism may lock and unlock the container on the vehicle body. When the above vehicle is used for carrying or transportation of the container, the processes for locking and unlocking the container may be simplified by cooperation of the microcontroller unit and the locking mechanism. Thus, the locking and unlocking of the container may be automated, such that the time required for locking the container to the vehicle body and unlocking the container from the vehicle body may be shortened. That is, the efficiency in locking/unlocking the container to/from the vehicle body may be improved and the time required for loading/offloading the container to/from the vehicle may be shortened. Accordingly, the vehicle is advantageous in that it is capable of locking and unlocking the container in a simple way, thereby improving the efficiency of the vehicle in transportation of the container.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

A vehicle for carrying a container is provided according to embodiments of the present disclosure. A locking mechanism of the vehicle may switch between a locked state and an unlocked state under control of a microcontroller unit. When the above vehicle is used for carrying or transportation of a container, the processes for locking and unlocking the container may be simplified i.e., the locking and unlocking of the container may be automated. Accordingly, the vehicle is advantageous in that it is capable of locking and unlocking the container in a simple way, thereby improving the efficiency of the vehicle in transportation of the container. The above vehicle may be an unmanned vehicle, an ordinary truck driven by a driver, or a rail vehicle carrying a container.

Figure 1:
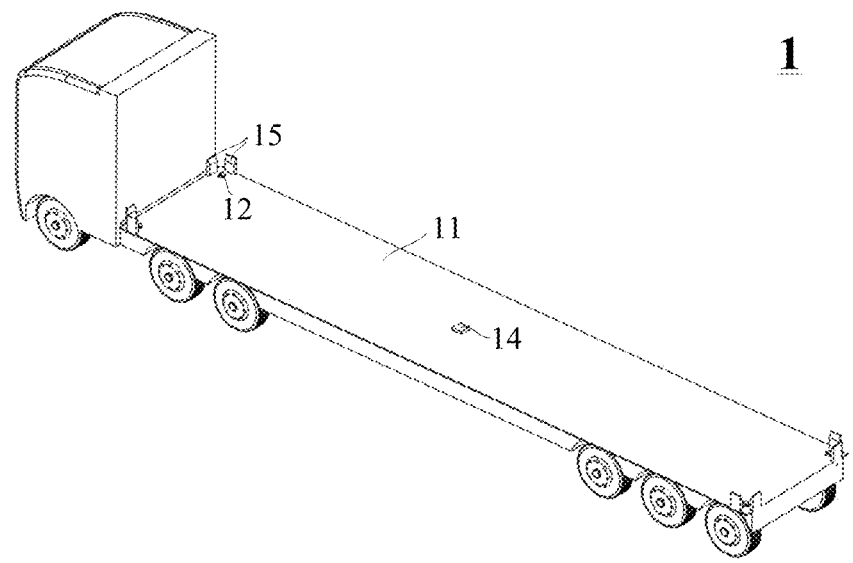
FIG. 1 is a schematic diagram showing a structure of a vehicle for carrying a container according to some embodiments of the present disclosure.
Figure 2:
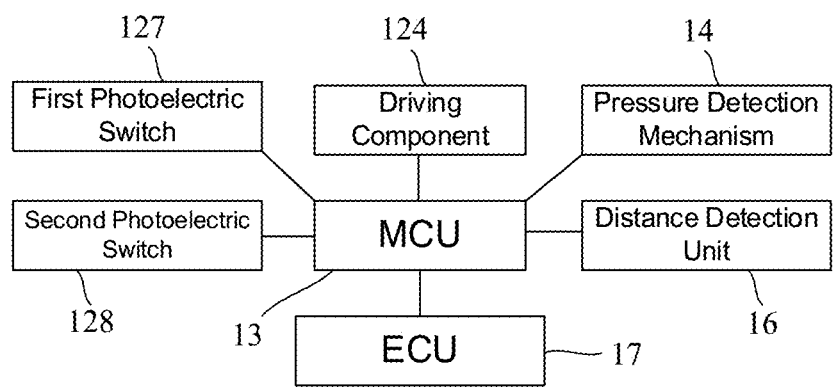
FIG. 2 is a schematic diagram showing an operating principle of a vehicle for carrying a container according to some embodiments of the present disclosure.
Figure 3:
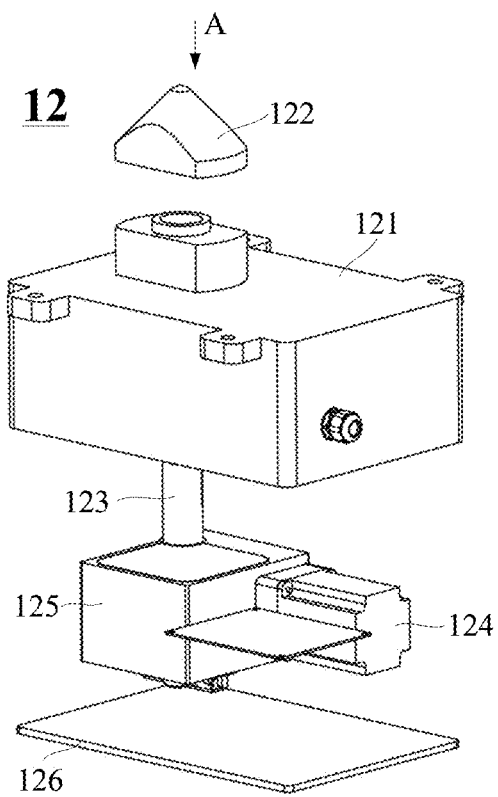
FIG. 3 is an explosive view showing a structure of a locking mechanism in the vehicle shown in FIG. 1.

Here, referring to FIGS. 1, 2 and 3, a vehicle 1 for carrying a container is provided according to some embodiments of the present disclosure. The vehicle 1 includes a vehicle body 11 on which a container is placed. The vehicle body 11 as shown in FIG. 1 has a flat-plate structure. Alternatively, the vehicle body 11 may have surrounding sideboards, or have a structure matching a specific container. The structure of the vehicle body 11 is not limited to the one shown in FIG. 1.

The above vehicle 1 further includes at least one locking mechanism 12 provided on the vehicle body 11 and a microcontroller unit 13 communicatively connected to each of the at least one locking mechanism 12. As shown in the structure of FIG. 1, one locking mechanism 12 is provided at each of four corners of the vehicle body 11. Each of the four locking mechanisms 12 is communicatively connected to the microcontroller unit 13, such that the microcontroller unit 13 may control the locking mechanisms 12. In order to lock the container to the vehicle body 11 reliably, one, two, three, four or more locking mechanisms 12 may be provided on the vehicle body 11 (the present disclosure is not limited to four locking mechanisms provided in the structure shown in FIG. 1). When a plurality of locking mechanisms 12 is provided, their respective positions and arrangement may be configured flexibly. The Microcontroller Unit (MCU) is also referred to as Single Chip Microcomputer or Single Chip Machine.

The microcontroller unit 13 is configured to control each locking mechanism 12 to switch between a locked state and an unlocked state.

Here, each locking mechanism 12 is connected fixedly to the container when the locking mechanism 12 is in the locked state, such that the container is fixed to the vehicle body 11.

When each locking mechanism 12 is in the unlocked state, the container, when having an external force acting thereon, is movable with respect to the vehicle body 11.

For the vehicle 1 according to the embodiments of the present disclosure to carry a container, hoisting equipment such as a crane places the container on the vehicle body 11, with each locking mechanism 12 aligned with a lock hole provided on the container. The microcontroller unit 13 controls each locking mechanism 12 to switch from the unlocked state to the locked state, such that the locking mechanisms 12 may lock the container to the vehicle body 11, i.e., the container is fixed to the vehicle body 11. In order to offload the container from the vehicle body 11, first the microcontroller unit 13 may control each locking mechanism 12 to switch from the locked state to the unlocked state, and then hoisting equipment such as a crane may hoist the container away from the vehicle body 11, thereby completing transportation of the container.

Under control of the microcontroller unit 13, the locking mechanisms 12 of the vehicle 1 may lock and unlock the container placed on the vehicle body 11. Thus, when the above vehicle 11 is used for carrying or transportation of the container, the processes for locking and unlocking the container may be simplified by cooperation of the microcontroller unit 13 and the locking mechanisms 12. Thus, the locking and unlocking of the container may be automated, such that the time required for locking the container to the vehicle body 11 and unlocking the container from the vehicle body 11 may be shortened. That is, the efficiency in locking/unlocking the container to/from the vehicle body 11 may be improved and the time required for loading/offloading the container to/from the above vehicle 1 may be shortened.

To summarize, the vehicle 1 is advantageous in that it is capable of locking and unlocking the container in a simple way, thereby improving the efficiency of the vehicle 1 in transportation of the container.

In a particular implementation, as shown in the structure of FIG. 1, the above vehicle 1 may further include a pressure detection mechanism 14 provided on the vehicle body 11 and communicatively connected to the microcontroller unit 13. As shown in the structure of FIG. 1, a pressure detection mechanism 14 is provided at a central position of the vehicle body 11. One, two, three or more pressure detection mechanisms 14 may be provided on the vehicle body 11.

The pressure detection mechanism 14 may be any detection mechanism capable of detecting a pressure, such as a pressure sensor, a gravity sensor or a weight sensor. In particular, the pressure sensor may be a piezoelectric pressure sensor, a piezoresistive pressure sensor, a sapphire pressure sensor or the like, and the weight sensor may be a photoelectric weight sensor, a capacitive weight sensor, a hydraulic weight sensor, a vibration weight sensor, a gyro weight sensor or the like.

The pressure detection mechanism 14 is configured to detect a value of a pressure applied by the container on the vehicle body 11 and input a signal indicating the detected value of the pressure to the microcontroller unit 13.

When the value of the pressure as detected by the pressure detection mechanism 14 is larger than a predetermined value, the microcontroller unit 13 controls the locking mechanisms 12 to act to switch from the unlocked state to the locked state.

As shown in the structures of FIGS. 1 and 2, when the container is being hoisted by hoisting equipment, such as a crane, to approach the vehicle body 11 or onto the vehicle body 11, the weight of the container is applied to the pressure detection mechanism 14. The pressure applied by the container may be detected by the pressure detection mechanism 14, which inputs the signal indicating the detected value of the pressure to the microcontroller unit 13. The microcontroller unit 13 controls the locking mechanisms 12 to act based on the received signal indicating the value of the pressure. When the received value of the pressure is larger than the predetermined value, indicating that the container is in place, the microcontroller unit 13 controls the locking mechanisms 12 to enter the locked state, such that the locking mechanisms 12 may fix the container to the vehicle body 11, in order for the vehicle 1 to carry the container.

With the above vehicle 1, the pressure detection mechanism 14 may detect the pressure signal for the container, and then the microcontroller unit 13 may determine whether the container is on the vehicle body 11 by comparing the value of the pressure with the predetermined value, thereby achieving automatic control of the locking mechanisms 12. In this way, both manpower and time may be saved and the operating efficiency of the vehicle 1 may be improved.

Figure 4:
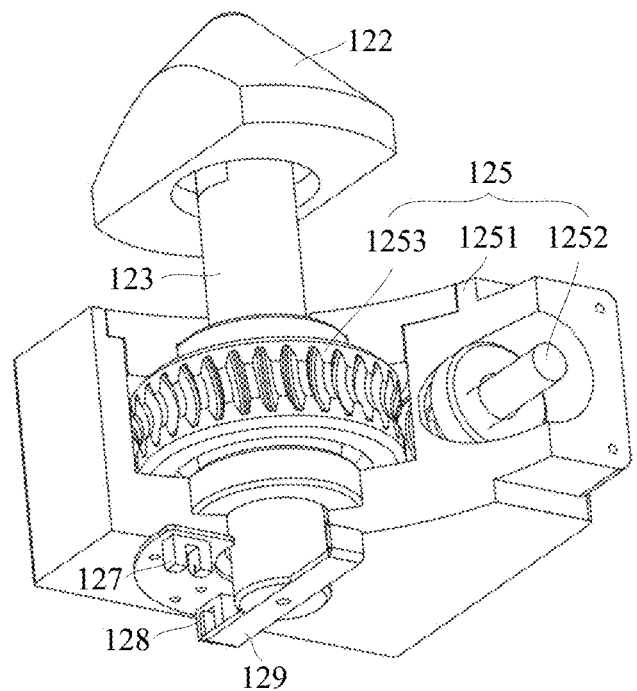
FIG. 4 is a partial sectional view of the locking mechanism shown in FIG. 3.
Figure 5:
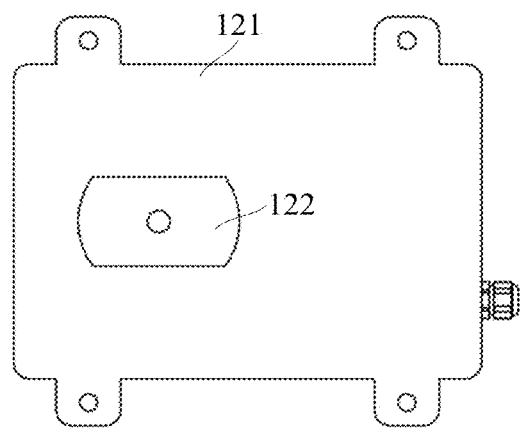
FIG. 5 is a schematic diagram showing a structure of the locking mechanism shown in FIG. 3 in direction A when it is in an unlocked state.

In particular, as shown in the structures of FIGS. 3 and 4, each locking mechanism 12 may include a housing 121 mounted to the vehicle body 11, a lock 122 protruding from a top of the housing 121, a lock lever 123 connected fixedly to the lock 122 and mounted to the housing 121 in such a manner that the lock lever 123 is rotatable about its axis, and a driving component 124 for driving the lock lever 123 to rotate. As shown in the structure of FIG. 3, each locking mechanism 12 may further include a transmission component 125 connected transmissively to the driving component 124. The driving component 124 may drive the lock lever 123 to rotate clockwise or counter-clockwise via the transmission component 125. Alternatively, the driving component 124 may directly drive the lock lever 123 to rotate. As shown in the structure of FIG. 5, in this case the locking mechanism 12 is in the unlocked state. When the lock lever 123 rotates clockwise or counter-clockwise as driven by the driving component 124, i.e., when the lock 122 rotates from the position shown in FIG. 5 to the position shown in FIG. 6, the locking mechanism 12 switches from the unlocked state to the locked state.

Figure 6:
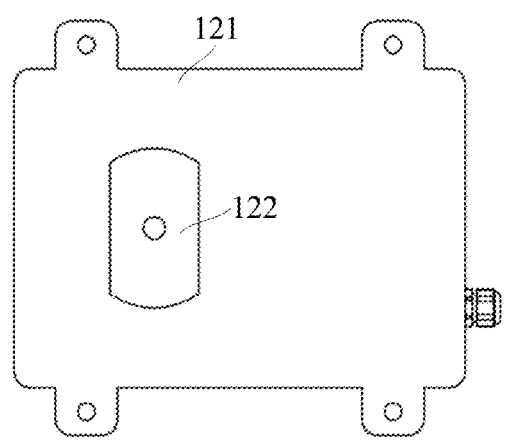
FIG. 6 is a schematic diagram showing a structure of the locking mechanism shown in FIG. 3 in direction A when it is in a locked state.

The driving component 124 is communicatively connected to the microcontroller unit 13 and configured to act based on an output signal received from the microcontroller unit 13 to drive the lock lever 123 to rotate by a predetermined angle such that the lock 122 may lock and unlock the container. As shown in the structures of FIGS. 5 and 6, the predetermined angle may be 90° or 270°. Alternatively, it may be set as any angle, not limited to 90° or 270°, depending on actual situations.

With the above vehicle 1, the microcontroller unit 13 may control the driving component 124 to allow the lock lever 123 of the locking mechanism 12 to rotate with the lock 122, so as to achieve automatic locking and unlocking of the container and, in turn, automated locking/unlocking of the container to/from the vehicle 1. This facilitates unmanned operation and automated loading/offloading of a container to/from an unmanned vehicle carrying the container.

In order to improve the accuracy of the automated operations of the vehicle 1, as shown in the structures of FIGS. 3 and 4, the locking mechanism 12 may further include a first photoelectric switch 127 and a second photoelectric switch 128 each mounted to the housing 121, and a block sheet 129 mounted to the lock lever 123. Each of the first photoelectric switch 127 and the second photoelectric switch 128 is communicatively connected to the microcontroller unit 13 and configured to input a switching signal to the microcontroller unit 13. In practice, they may be configured depending on actual situations. For example, in FIG. 4, the locking mechanism 12 may be in the unlocked state when the block sheet 129 is at a position corresponding to the second photoelectric switch 128, or in the locked state when the block sheet 129 is at a position corresponding to the first photoelectric switch 127.

When the microcontroller unit 13 controls the locking mechanism 12 to switch from the unlocked state to the locked state, the driving component 124 drives the lock lever 123 to rotate by a predetermined angle in a first direction, such that the block sheet 129 is at a position corresponding to the first photoelectric switch 127 and the first photoelectric switch 127 transmits a locking signal to the microcontroller unit 13. Here, the first direction may be a clockwise direction or a counter-clockwise direction.

When the microcontroller unit 13 controls the locking mechanism 12 to switch from the locked state to the unlocked state, the driving component 124 drives the lock lever 123 to rotate by a predetermined angle in a second direction opposite to the first direction, such that the block sheet 129 is at a position corresponding to the second photoelectric switch 128 and the second photoelectric switch 128 transmits an unlocking signal to the microcontroller unit 13. The second direction may be a counter-clockwise direction or a clockwise direction, corresponding to the above first direction.

With the above vehicle 1, the locking mechanism 12 is provided with the first photoelectric switch 127 and the second photoelectric switch 128, as well as the block sheet 129 provided on the lock lever 123. Thus, when the driving component 124 drives the lock lever 123 to rotate, the block sheet 129 rotates with the lock lever 123. When the block sheet 129 rotates to the position corresponding to the first photoelectric switch 127, the block sheet 129 blocks the first photoelectric switch 127, such that the first photoelectric switch 127 generates an electrical signal and transmits the locking signal to the microcontroller unit 13. As shown in the structure of FIG. 3, the lock 122 rotates to a locked position. When the block sheet 129 rotates, as driven by the driving component 124, to the position corresponding to the second photoelectric switch 128, it blocks the second photoelectric switch 128, such that the second photoelectric switch 128 generates an electrical signal and transmits the unlocking signal to the microcontroller unit 13. As shown in the structure of FIG. 4, the lock 122 rotates exactly to an unlocked position. With the locking signal or unlocking signal generated by the first photoelectric switch 127, the second photoelectric switch 128 and the block sheet 129, the state of the locking mechanism 12 may be further determined, such that the microcontroller unit 13 may control the locking mechanism 12 accurately, and in turn control the vehicle 1 more accurately, thereby avoiding faulty operations.

In order to increase the driving torque, as shown in the structures of FIGS. 3 and 4, the locking mechanism 12 may further include a transmission component 125 connected transmissively between the driving component 124 and the lock lever 123. The transmission component 125 may be a worm-gear component, a gear transmission component or a threaded transmission component. As shown in the structure of FIG. 4, the transmission component 125 is a worm-gear transmission component and includes a transmission component housing 1251 within the housing 121, a worm 1252 transmissively connected to the driving component 124, and a worm gear 1253 engaged with the worm 1252. The worm gear 1253 is co-axial with and connected to the lock lever 123 by means of key joint. The driving force applied by the driving component 124 is transmitted to the lock lever 123 via the worm 1252 and the worm gear 1253, driving the lock 122 to lock and unlock the locking mechanism 12.

The above driving component 124 may be an electric motor such as a stepper motor, a Direct Current (DC) motor, a variable frequency motor, or the like.

In order to improve the alignment accuracy and locating efficiency in hoisting of the container, the above vehicle 1 may further include a plurality of guiding blocks 15 mounted to the vehicle body 11 and configured to locate the container such that the container is aligned with each of the locking mechanisms 12. As shown in the structure of FIG. 1, the plurality of guiding blocks 15 may be stop plates provided at four corners of the vehicle body 11, respectively, or may be other structures, e.g., stop blocks, provided at other positions of the vehicle body 11. With the guiding blocks 15, the container may be aligned with the locking mechanisms 12 rapidly, so as to avoid waste of time and reduced transportation efficiency of the vehicle 1 due to misalignment between the container and the locking mechanisms 12.

In order to improve the automation and utilization of the above vehicle 1, as shown in the structure of FIG. 2, the vehicle 1 may further include a distance detection unit 16 and an Electronic Control Unit (ECU) 17 each communicatively connected to the microcontroller unit 13. The ECU is also referred to as "driving computer" or "on-board computer". The distance detection unit 16 may be an optical sensor, an infrared sensor, an ultrasonic sensor or the like.

The electronic control unit 17 is configured to automatically control the vehicle 1 to enable automated driving of the vehicle 1.

The distance detection unit 16 is configured to detect a distance between the container and the vehicle body 11 in a vertical direction and transmit a value of the detected distance to the microcontroller unit 13, such that when the value of the distance detected by the distance detection unit 16 is larger than a predetermined distance, the microcontroller unit 13 transmits a movement signal to the electronic control unit 17 and the electronic control unit 17 controls the vehicle 1 to move based on the movement signal received from the microcontroller unit 13.

When the container is offloaded from the vehicle 1, the distance detection unit 16 may detect the distance between the vehicle body 11 and the container. When the distance between the vehicle body 11 and the container is larger than the predetermined distance, the microcontroller unit 13 may determine that the container will not affect movement of the vehicle 1 and may thus transmit a signal to the electronic control unit 17 which may then control the vehicle to move. Accordingly, the cooperation of the distance detection unit 16 and the electronic control unit 17 allows automated driving of the vehicle 1, such that the vehicle 1 may be fully utilized and the transportation efficiency and utilization of the vehicle 1 may be improved.

The above vehicle may be an unmanned vehicle, an ordinary truck or rail vehicle, or an unmanned rail vehicle.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A vehicle for carrying a container, comprising:
 a vehicle body on which a container is placed;
 at least one locking mechanism provided on the vehicle body;
 a microcontroller unit communicatively connected to each of the at least one locking mechanism and configured to control each of the at least one locking mechanism to switch between a locked state and an unlocked state; and
 a pressure detection mechanism provided on the vehicle body and communicatively connected to the microcontroller unit, wherein:
  the pressure detection mechanism is configured to detect a value of a pressure applied by the container on the vehicle body and input a signal indicating the detected value of the pressure to the microcontroller unit,
  the microcontroller unit is further configured to control each of the at least one locking mechanism to act to switch from the unlocked state to the locked state, in response to the value of the pressure as detected by the pressure detection mechanism being larger than a predetermined value, and
 each of the at least one locking mechanism is configured to:
  fix the container to the vehicle body in response to the locking mechanism being in the locked state, and
  allow the container, when having an external force acting thereon, to be moved with respect to the vehicle body in response to each of the at least one locking mechanism being in the unlocked state.

2. The vehicle of claim 1, wherein each of the at least one locking mechanism comprises a housing mounted to the vehicle body, a lock protruding from a top of the housing, a lock lever connected fixedly to the lock and mounted to the housing in such a manner that the lock lever is rotatable about its axis, and a driving component for driving the lock lever to rotate, and the driving component is communicatively connected to the microcontroller unit and configured to act based on an output signal received from the microcontroller unit to drive the lock lever to rotate by a predetermined angle such that the lock can lock and unlock the container.

3. The vehicle of claim 2, wherein each of the at least one locking mechanism further comprises a first photoelectric switch and a second photoelectric switch each mounted to the housing, and a block sheet mounted to the lock lever, each of the first photoelectric switch and the second photoelectric switch being communicatively connected to the microcontroller unit and configured to input a switching signal to the microcontroller unit, when the microcontroller unit controls the locking mechanism to switch from the unlocked state to the locked state, the driving component drives the lock lever to rotate by a predetermined angle in a first direction, such that the block sheet is at a position corresponding to the first photoelectric switch and the first photoelectric switch transmits a locking signal to the microcontroller unit, and when the microcontroller unit controls the locking mechanism to switch from the locked state to the unlocked state, the driving component drives the lock lever to rotate by a predetermined angle in a second direction opposite to the first direction, such that the block sheet is at a position corresponding to the second photoelectric switch and the second photoelectric switch transmits an unlocking signal to the microcontroller unit.

4. The vehicle of claim 2, wherein each of the at least one locking mechanism further comprises a transmission component connected transmissively between the driving component and the lock lever.

5. The vehicle of claim 4, wherein the transmission component comprises a worm-gear component, a gear transmission component or a threaded transmission component.

6. The vehicle of claim 2, wherein the driving component comprises a stepper motor.

7. The vehicle of claim 1, further comprising a plurality of guiding blocks mounted to the vehicle body and configured to locate the container such that the container is aligned with each of the at least one locking mechanism.

8. A vehicle for carrying a container, comprising:
a vehicle body on which a container is placed;
at least one locking mechanism provided on the vehicle body;
a microcontroller unit communicatively connected to each of the at least one locking mechanism and configured to control each of the at least one locking mechanism to switch between a locked state and an unlocked state;
a distance detection unit communicatively connected to the microcontroller unit; and
an electronic control unit communicatively connected to the microcontroller unit,
wherein:
the electronic control unit is configured to automatically control the vehicle to enable automated driving of the vehicle,
the distance detection unit is configured to detect a distance between the container and the vehicle body in a vertical direction and transmit a value of the detected distance to the microcontroller unit, the microcontroller unit is further configured to transmit a movement signal to the electronic control unit, in response to the value of the distance detected by the distance detection unit being larger than a predetermined distance, the electronic control unit is further configured to control the vehicle to move based on the movement signal received from the microcontroller unit, the at least one locking mechanism is configured to:
fix the container to the vehicle body in response to the locking mechanism being in the locked state, and
allow the container, when having an external force acting thereon, to be moved with respect to the vehicle body in response to each of the at least one locking mechanism being in the unlocked state.

9. The vehicle of claim 8, wherein the distance detection unit comprises an ultrasonic sensor.

10. A method for operating a vehicle for carrying a container, the vehicle comprising:
a vehicle body on which a container is placed;
at least one locking mechanism provided on the vehicle body;
a microcontroller unit communicatively connected to each of the at least one locking mechanism and configured to control each of the at least one locking mechanism to switch between a locked state and an unlocked state; and
a pressure detection mechanism provided on the vehicle body and communicatively connected to the microcontroller unit,
the at least one locking mechanism is configured to:
fix the container to the vehicle body in response to the locking mechanism being in the locked state, and
allow the container, when having an external force acting thereon, to be moved with respect to the vehicle body in response to each of the at least one locking mechanism being in the unlocked state,
the method comprising:
detecting, by the pressure detection mechanism, a value of a pressure applied by the container on the vehicle body,
transmitting, by the pressure detection mechanism, a signal indicating the detected value of the pressure to the microcontroller unit,
controlling, by the microcontroller unit, each of the at least one locking mechanism to act to switch from the unlocked state to the locked state, in response to the value of the pressure as detected by the pressure detection mechanism being larger than a predetermined value.

11. The method of claim 10, wherein each of the at least one locking mechanism comprises a housing mounted to the vehicle body, a lock protruding from a top of the housing, a lock lever connected fixedly to the lock and mounted to the housing in such a manner that the lock lever is rotatable about its axis, and a driving component for driving the lock lever to rotate, and the driving component is communicatively connected to the microcontroller unit,
the method further comprising:
driving, by the driving component, the lock lever to rotate by a predetermined angle based on an output signal received from the microcontroller unit.

12. The method of claim 11, wherein each of the at least one locking mechanism further comprises a first photoelectric switch and a second photoelectric switch each mounted to the housing, and a block sheet mounted to the lock lever, each of the first photoelectric switch and the second photoelectric switch being communicatively connected to the microcontroller unit and configured to input a switching signal to the microcontroller unit, the method further comprising:
- driving, by the driving component, the lock lever to rotate by a predetermined angle in a first direction, in response to the microcontroller unit controlling the locking mechanism to switch from the unlocked state to the locked state,
- transmitting, by the first photoelectric switch, a locking signal to the microcontroller unit, in response to the block sheet being rotated to a position corresponding to the first photoelectric switch, and
- driving, by the driving component, the lock lever to rotate by a predetermined angle in a second direction opposite to the first direction, in response to the microcontroller unit controlling the locking mechanism to switch from the locked state to the unlocked state,
- transmitting, by the second photoelectric switch, an unlocking signal to the microcontroller unit, in response to the block sheet is rotated to a position corresponding to the second photoelectric switch.

13. The method of claim 11, wherein each of the at least one locking mechanism further comprises a transmission component connected transmissively between the driving component and the lock lever.

14. The method of claim 13, wherein the transmission component comprises a worm-gear component, a gear transmission component or a threaded transmission component.

15. The method of claim 11, wherein the driving component comprises a stepper motor.

16. The method of claim 10, wherein the vehicle further comprises a plurality of guiding blocks mounted to the vehicle body and configured to locate the container such that the container is aligned with each of the at least one locking mechanism.

17. The method of claim 16, wherein the vehicle further comprises a distance detection unit and an electronic control unit each communicatively connected to the microcontroller unit, wherein the electronic control unit is configured to automatically control the vehicle to enable automated driving of the vehicle, the method further comprising:
- detecting, by the distance detection unit, a distance between the container and the vehicle body in a vertical direction,
- transmitting, by the distance detection unit, a value of the detected distance to the microcontroller unit,
- transmitting, by the microcontroller unit, a movement signal to the electronic control unit in response to the value of the distance detected by the distance detection unit being larger than a predetermined distance,
- controlling, by the electronic control unit, the vehicle to move based on the movement signal received from the microcontroller unit.

18. The method of claim 17, wherein the distance detection unit comprises an ultrasonic sensor.

* * * * *